Feb. 12, 1929.

C. P. SHAW 1,701,547

METHOD OF SHAPING CUTTING RULES FOR DIES

Filed Oct. 6, 1926      2 Sheets-Sheet 1

INVENTOR.
Charles P. Shaw.
BY
Stuart C. Barnes
ATTORNEY.

Feb. 12, 1929.  
C. P. SHAW  
1,701,547  
METHOD OF SHAPING CUTTING RULES FOR DIES  
Filed Oct. 6, 1926  2 Sheets-Sheet 2

INVENTOR.  
Charles P. Shaw  
BY  
Stuart C. Barnes  
ATTORNEY.

Patented Feb. 12, 1929.

1,701,547

UNITED STATES PATENT OFFICE.

CHARLES P. SHAW, OF DETROIT, MICHIGAN.

METHOD OF SHAPING CUTTING RULES FOR DIES.

Application filed October 6, 1926. Serial No. 139,880.

This invention has to do with dies of the type for blanking out shapes from sheet material, and the invention is concerned more especially with a method of shaping cutting rules for the edges of such dies.

In my copending applications, Serial Nos. 139,878 and 139,879, filed October 6, 1926, I have described blanking dies in which the punch and die are made of a relatively soft metal, and a cutting rule of hard metal is used in conjunction with the soft metal. It is the aim of this invention to provide a method of shaping the rule which is used as a cutting edge. The method consists primarily in utilizing the die or punch, or both, in shaping the rule. By proceeding according to the method, the rule is very accurately shaped, since it is shaped by a die member with which it is to be used, or with an identical die member and, in addition, the shaping of the rule can be quickly and easily accomplished.

The method is exemplified in the accompanying drawings wherein.

Figure 1:
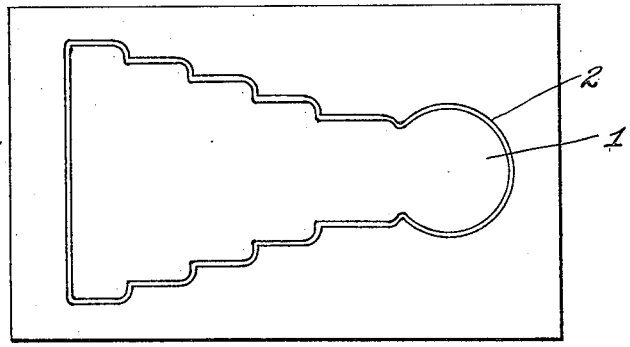
Fig. 1 is a plan view of a piece of metal with the design which is to be blanked out cut from the metal.
Figure 2:
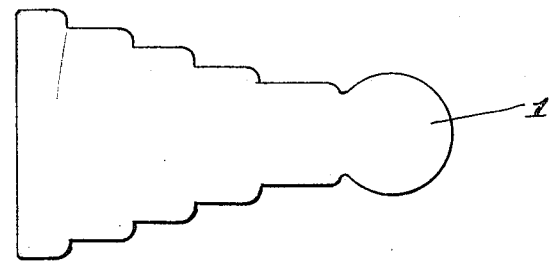
Fig. 2 is a plan view of the piece of metal which is removed and which is to be used as a punch.
Figure 3:
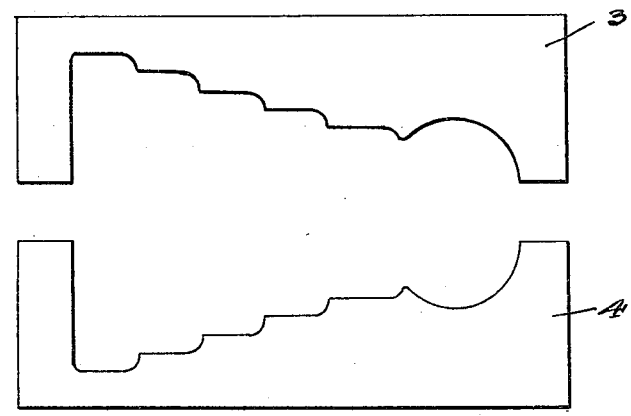
Fig. 3 is a view of the remaining metal which is to be used as a die, the metal being severed approximately centrally.

Referring to the drawings, a piece of metal is shown in Fig. 1 and the design which is to be blanked out by the die is cut in this piece of metal. The metal used is preferably steel, and the design is cut through the steel by means of a saw or routing machine, the cutting tool kerf being shown at 2. The piece of metal 1 which is the shape of the design which is to be blanked out, (Fig. 2) is removed and is to be used as a punch. The remaining metal is severed, as shown in Fig. 3. These two pieces of metal 3 and 4 are to be used as the die.

Figure 4:
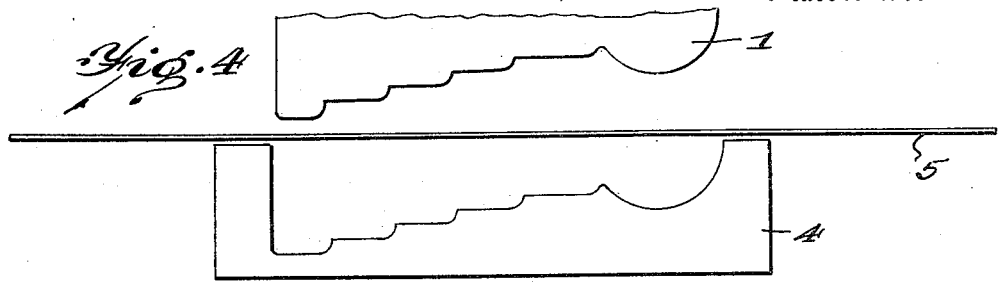
Fig. 4 is a view showing how the parts are placed just prior to the shaping of the rule.
Figure 5:
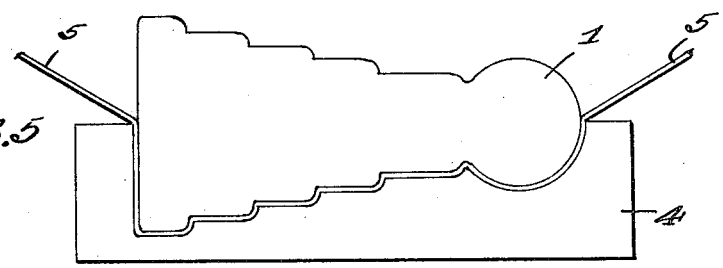
Fig. 5 is a view similar to Fig. 4 showing how the parts are brought together to shape the rule.

The steel from which the punch and die are thus cut, is relatively soft and a cutting rule of hard steel is used around the edges of the die. As shown in Fig. 4, the rule 5 is placed between the punch 1 and one of the severed die members. The punch and the die member are now brought together with sufficient force so as to cause the rule to take the shape of the design, as shown in Fig. 5.

This operation forms, in the present instance, one half of the cutting rule, and the other half is formed in the same manner. With the design shown the two halves of the rule can be formed by the use of only one of the members 3 or 4, but in the case of a design having a different form on each side, both of such members will be used.

Figure 6:
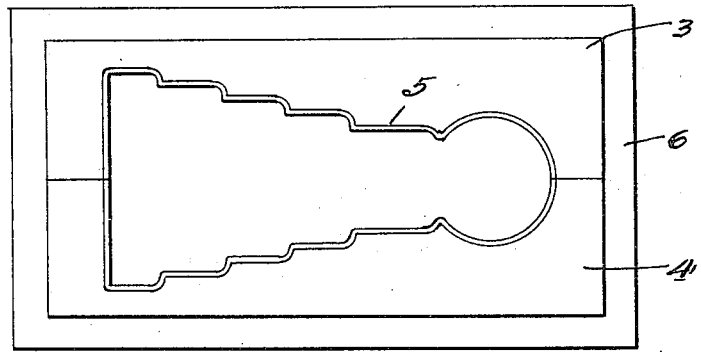
Fig. 6 is a plan view of the die member with the cutting rule inserted and the two parts placed together in their original position.
Figure 7:
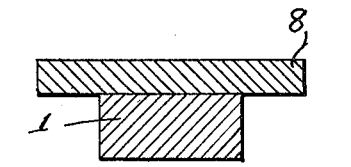
Fig. 7 is a cross sectional view of a punch die made from a single layer of metal.

After the rule is formed the members 3 and 4 are placed together, as shown in Fig. 6, and may be secured, as by means of bolts, or in any other desired manner, to a base or support 6. The rule is disposed around the edges of the design and may be held in place by the filling in of a workable material 7, such as wood or soft metal (Fig. 7). The punch member 1 may be secured to a support 8 in a manner similar to the manner in which the die is secured to its support 6, and the two members are now ready to blank out the shapes. The operation is in the usual manner in that the sheet metal, or other material to be blanked, is placed between the members and the members are brought together with the punch 1 cooperating with the cutting rule 5. Preferably the punch is the movable member. A stripper may be used to strip the blanked forms from the die member.

Figure 8:
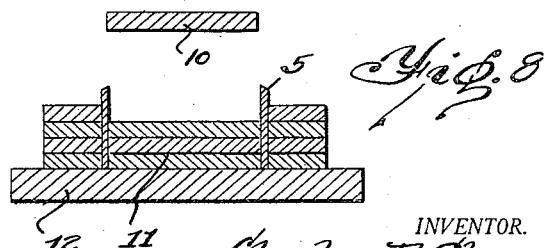
Fig. 8 is a cross sectional view taken through a piece of laminated metal.

As shown in Fig. 8, the punch and the die may be made from a piece of laminated metal. The design is cut in the laminated metal in the same way it is cut from the solid piece of metal and the shaping of the rule is accomplished in the same way. In this form the punch is made by the use of one or more of the laminations as shown at 10. This leaves the remaining laminations 11 within the rule for holding it in place. The cutting rule, which is used, is of a thickness substantially equal to the kerf formed by the cutting tool, and when the rule is placed in the saw kerf an accurate fit as between the punch and the cutting rule is obtained. The several laminations are secured together before the design is cut therefrom, and when in use may be secured to a base 12. Likewise the punch 10 may be secured to support or base (not shown).

The rule may be bent while it is in a soft or semi-hardened condition, and this is perhaps a desirable procedure where sharp angles or small curves must be made. After the rule is bent and is held in position, as shown in Figs. 7 and 8, the whole die member may be subjected to a hardening treatment. This hardening treatment is not of a great duration due to the fact that the rule is of a thin material and hardens quickly, and the large body of metal is not materially affected by the treatment. In some cases the design may be such that the rule may be bent while it is in the form of hardened tool or die steel.

It is perhaps preferable to shape the rule by the use of the die and punch with which the rule is to be used so that a very accurate shaping, as between the particular die and punch and rule is obtained. In instances where a plurality of dies are to be made of the same shape, a plurality of rules may be shaped by the use of only one die and punch member.

What I claim is:

The method of shaping cutting rule for dies which comprises, placing the rule in a soft condition between a divided portion of the die and a punch, bringing the portion of the die and the punch together with a relative movement transverse to the normal operating movement of the punch and die and with sufficient pressure to cause the rule to take the shape of the punch and die, and then hardening the rule.

In testimony whereof I affix my signature.

CHARLES P. SHAW.